(12) United States Patent
Torra et al.

(10) Patent No.: US 8,997,976 B2
(45) Date of Patent: Apr. 7, 2015

(54) ASSEMBLY FOR SUPPORTING AND GUIDING CONVEYOR BELTS

(76) Inventors: Cecilia Vila Torra, Santpedor (ES); Jordi Gavalda Monedero, Llinars del Valles (ES)

( * ) Notice: Subject to any disclaimer, the term of this patent is extended or adjusted under 35 U.S.C. 154(b) by 298 days.

(21) Appl. No.: 13/384,409

(22) PCT Filed: Jul. 15, 2010

(86) PCT No.: PCT/ES2010/070491
§ 371 (c)(1),
(2), (4) Date: Jan. 18, 2012

(87) PCT Pub. No.: WO2011/007040
PCT Pub. Date: Jan. 20, 2011

(65) Prior Publication Data
US 2012/0125740 A1 May 24, 2012

(30) Foreign Application Priority Data

Jul. 17, 2009 (EP) .................................... 09165764
Jul. 17, 2009 (EP) .................................... 09165774
Dec. 14, 2009 (EP) .................................... 09179053

(51) Int. Cl.
*B65G 21/20* (2006.01)
*B65G 15/02* (2006.01)
*B65G 15/56* (2006.01)

(52) U.S. Cl.
CPC ................ *B65G 15/02* (2013.01); *B65G 15/56* (2013.01)

(58) Field of Classification Search
CPC ................................ B65G 15/56; B65G 15/02
USPC ............................................ 198/837, 867.01
See application file for complete search history.

(56) References Cited

U.S. PATENT DOCUMENTS 4,955,466 A 9/1990 Almes et al.
(Continued)

FOREIGN PATENT DOCUMENTS

DE 295 02 064.4 6/1995
DE 44 12 931 A1 10/1995
(Continued)

OTHER PUBLICATIONS

20100122894 Schoning REF 13384409 dwg.*
International Search Report issued on Nov. 24, 2010 by the International Searching Authority in connection with International Application No. PCT/ES2010/070491.
Written Opinion issued on Nov. 24, 2010 by the International Searching Authority in connection with International Application No. PCT/ES2010/070491.

*Primary Examiner* — Gene Crawford
*Assistant Examiner* — Lester Rushin
(74) *Attorney, Agent, or Firm* — Gary J. Gershik; Cooper & Dunham LLP

(57) ABSTRACT

The invention relates to a supporting and guiding assembly for conveyor belts comprising a frame (1) which comprises at least one base element (1a), and at least one substantially flat structure (33a) supported by said at least one base element (1a); wherein said at least one substantially flat structure (33a) is projecting with respect to said at least one base element (1a) and is open on one of its sides through which said at least one conveyor belt (2) can be introduced/removed; and wherein said assembly additionally comprises at least one supporting and guiding mechanism of at least one conveyor belt from at least one perimetric guiding profile; such that it allows considerably simplifying the maintenance, repair and replacement of all the elements forming the assembly, minimizing the downtimes and saving in waiting costs and costs of parts to be replaced.

9 Claims, 18 Drawing Sheets

(56) References Cited

U.S. PATENT DOCUMENTS

| | | |
|---|---|---|
| 5,722,531 A | 3/1998 | Zimny et al. |
| 2006/0108207 A1 | 5/2006 | Duncan et al. |
| 2008/0041702 A1 | 2/2008 | McGuire et al. |
| 2010/0122894 A1 * | 5/2010 | Schoning et al. ............ 198/831 |

FOREIGN PATENT DOCUMENTS

| | | |
|---|---|---|
| DE | 195 35 757 A1 | 3/1997 |
| EP | 0 716 034 A1 | 6/1996 |
| EP | 0 849 192 A1 | 6/1998 |
| WO | WO 95/01928 | 1/1995 |

* cited by examiner

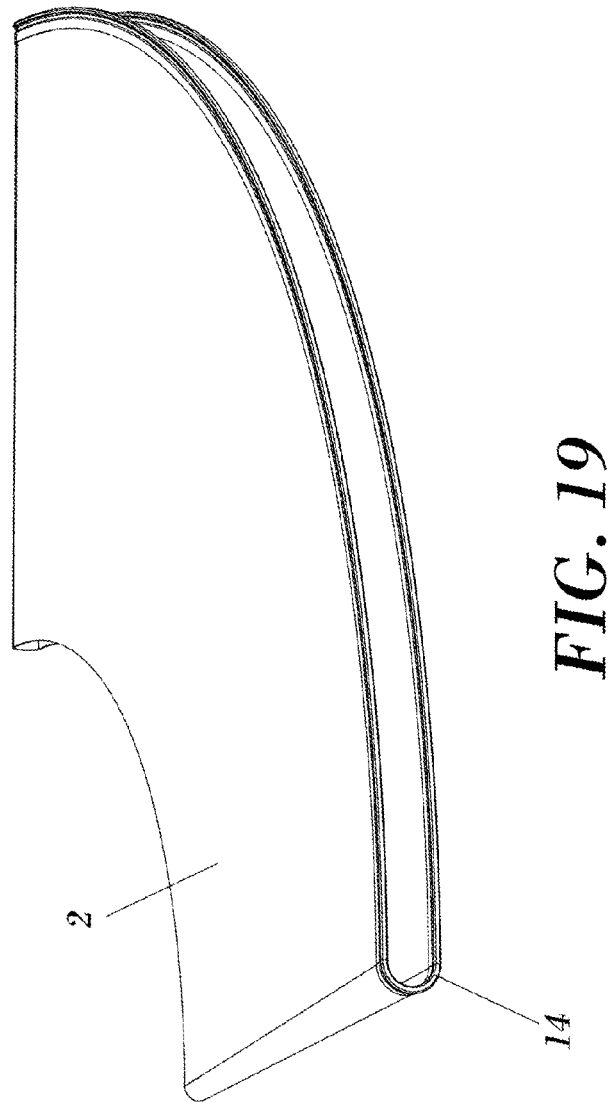

ASSEMBLY FOR SUPPORTING AND GUIDING CONVEYOR BELTS

TECHNICAL FIELD OF THE INVENTION

The present invention relates to a supporting and guiding assembly for conveyor belts of the type comprising a frame supporting the actual conveyor belts, as well as the actual supporting and guiding mechanisms for the latter, such as rollers, guiding bearings, etc.

Said supporting and guiding assembly is applicable in the transport and logistics industry, and more particularly it is aimed at the transport of luggage between different areas of airports; allowing considerably simplifying the maintenance, repair and replacement of all the elements forming the assembly, minimizing the downtimes and saving in waiting costs and costs of parts to be replaced.

BACKGROUND OF THE INVENTION

The installation of conveyor belts for moving parcels, packages or luggage from one point to another requires straight/curved segments to configure the path from the point of origin to the point of destination of the mentioned goods.

As has been mentioned; this supporting and guiding assembly for conveyor belts is normally used in installations, such as airports or logistic centers for goods, in which they are constantly operating, therefore the management of their maintenance and the repair of breakdowns must be very quick in order to reduce the downtime of the respective transport line.

Firstly, the replacement of the actual conveyor belt, either due to wearing or due to a breakage, gives rise to a stop in the operation of the transport line for a considerable time, since many of its components must be disassembled in order to be able to access and remove said conveyor belt. The latter is generally assembled on a frame provided with two live rollers arranged on the ends thereof, and on which the conveyor belt slides. These rollers are fastened, from both ends, to the frame of the conveyor belt, so in order to be able to remove it, it is previously necessary to disassemble all the protective, guiding and tensioning elements, and thus the fasteners of the rollers can be accessed. Once the end live rollers are released, the conveyor belt can be removed.

Therefore, the replacement of the conveyor belt represents a complex and laborious task which requires the intervention of several qualified operators and considerable time, with the consequent economic loss that this means.

Patent US 20080041702 is known in the state of the art and describes a pivotable support for conveyor belts which allows reducing the belt replacement times as a result of the articulation of such support with respect to at least one of its ends. This solution reduces the conveyor belt replacement time but it also entails a high complexity, since it is still necessary to disassemble a large amount of components to be able to pivot the conveyor belt, because the latter is still supported on both ends of the frame.

As has been mentioned, most problems and breakdowns occur in the curved segments, without excluding the straight segments but to a lesser extent, since the latter require perimetric supporting and guiding mechanisms for the curved conveyor belt to work correctly. These mechanisms comprise bearing type rolling means which retain and guide the curved conveyor belt through a perimetric guiding profile arranged to that effect in the outer perimeter of the conveyor belt and which comes into contact with the mentioned bearings. Patents EP 0706489, EP 0716034, DE 29502064 and DE 19535757 are known in the state of the art and describe supporting and guiding mechanisms like those described above, which are installed at the outside of the curve through the outer surface of the frame.

In supporting and guiding devices of this type, due to the radial oscillations typical of the belt, overstresses are generated thereon which cause constant breakdowns, vibrations and seizing of the bearings.

In the event of a breakdown it is necessary, for the conveyor belt, to locate the supporting and guiding device which has broken down, disassemble it, replace it and start up the conveyor belt again, with the consequent downtime.

Additionally, patent US 2006/108207 describes a supporting and guiding device comprising a pair of bearings located symmetrically with respect to the conveyor belt, but which has the great drawback that the device must be disassembled for the location of the malfunction, for its repair or simply for its visual maintenance, giving rise to a long stop and a prolonged maintenance time.

Since the devices described in the aforementioned patents are installed at the outside of the curve and the inner bearings are concealed by the conveyor belt itself, the location of the breakdown and its repair forces disassembling many of its components, with the increase of time that this entails. The downtimes for checking for and repairing breakdowns in curved conveyor belts with supporting and guiding devices of this type are excessively high, which generates considerable economic losses.

The guiding devices additionally comprise a plurality of bearings retaining and guiding the conveyor belt through the contact with a protrusion comprised in the aforementioned perimetric profile.

European patent EP0349830 is already known in the state of the art and describes a guide profile for conveyor belts, comprising a protrusion which is driven between the guide bearings, which protrusion is provided with a radial appendage provided with a conduit for housing the end of the conveyor belt. The drawback of the profile described in said patent is that it is excessively rigid, which causes vibrations, noise and breakdowns in the conveyor belts.

Radial oscillations occur in curved conveyor belts due to:
  The impossibility of making a completely circular section of the perimeter of the belt.
  The constitution of the belt itself, since the latter is obtained from a structure with crosslinked reinforcing strands, which causes a different radial behavior according to the distribution of said internal structure.

These radial oscillations cause on the different supporting and guiding elements for the belt cyclic overstresses which generate unpleasant noise, vibrations and fatigue, with the consequent machine breakdowns and stops.

Patent DE 4412931 is also known, in which the perimetric profile comprises an elastic area which is capable of absorbing part of the vibrations caused, but even so it experiences the radial oscillations and, additionally, said elastic area, in contact with the bearings, experiences high wearing, causing a very reduced service life.

DESCRIPTION OF THE INVENTION

The supporting and guiding assembly for conveyor belts proposed by the invention fully and satisfactorily solves the problems set forth above, such that it allows considerably simplifying the maintenance, repair and replacement of all the elements forming the assembly, minimizing the downtimes and saving in waiting costs and costs of parts to be replaced.

The frame for conveyor belts object of the invention comprises at least one base element, and at least one substantially flat structure supported by said at least one base element;

such that said at least one substantially flat structure is projecting with respect to said at least one base element and is open on one of its sides through which said at least one conveyor belt can be introduced/removed, and wherein said at least one conveyor belt is close to at least one of the flat faces of said at least one substantially flat structure in the service position.

The service position is understood as the one in which said at least one conveyor belt is moving and located close to at least one of the flat faces of the flat structure, such that it allows moving luggage or similar objects.

With this geometric arrangement of the frame, it can be observed how the substantially flat structure is projecting and therefore comprises a laterally accessible area for the inclusion/removal of said conveyor belt, with the consequent advantage of not requiring the disassembly of multiple additional elements (for example, without the removal of the rollers) from the entire assembly, reducing the inspection and replacement times of the actual belt and of the elements associated with it.

Said frame can adopt various configurations, but all of them comprise the technical feature of having a projecting substantially flat structure, close to which the conveyor belt is located and which allows a simple handling thereof.

The possibility is contemplated that said substantially flat structure comprises at least one laminar cover on which said conveyor belt slides; since the insertion/removal of the conveyor belt does not require disassembling its components, the laminar cover does not need to be removed to access the inner retaining components of said conveyor belt.

The possibility that at least one enveloping cover is located on an upper side of the substantially flat structure is additionally contemplated, and wherein said at least one enveloping cover comprises a lifting device for said at least one enveloping cover, allowing the placement/removal of said at least one conveyor belt; i.e., without needing to remove said at least one enveloping cover.

The conveyed items are thus prevented from hitting the lower elements, such as bearings, for example, especially in curved segments (although without excluding straight segments); said at least one enveloping cover additionally forms as such a protector against blows which furthermore prevents the inclusion of foreign elements inside the entire assembly. Furthermore, since said lifting device is provided, it allows the placement/removal of said at least one conveyor belt or, for example, the passage for the placement/removal of a perimetric guiding profile.

Said at least one lifting device optionally comprises a plurality of springs coupled on one hand to the upper part of the projecting upper sub-structure and on the other hand to said at least one enveloping cover, and a plurality of retaining elements of the plurality of springs which allow blocking/unblocking said springs.

The retaining elements can be retaining pins such that they comprise at least one inclined side flange, which pin penetrates the frame through at least one corresponding hole provided with at least one notch, such that it allows the passage of said at least one pin and can pass through said notch for the subsequent retention. Thus, by pressing on the enveloping cover, each pin is introduced in its respective hole, and by rotating them through their outer head, the enveloping cover is fastened against said frame.

In one of the preferred embodiments, the possibility is contemplated that the frame comprises a plurality of upper transverse elements and a plurality of lower transverse elements located perpendicular to the direction of movement at each point of said conveyor belt and at two height levels, a plurality of vertical elements coupled respectively at the end of each pair of transverse elements, located in one and the same vertical plane, such that they define a C-shaped sub-structure open at one of its ends through which said at least one conveyor belt can be introduced/removed, wherein the upper transverse elements coupled at the upper end of said vertical elements allow the sliding of said at least one conveyor belt over them and define the projecting substantially flat structure, and wherein the lower transverse elements coupled at the lower end of said vertical elements allow supporting the sliding of said at least one conveyor belt over them and define a lower sub-structure.

The substantially flat structure together with the lower sub-structure thus define the space through which said at least one conveyor belt can be removed/inserted in a simple manner without needing to disassemble a large number of elements comprised in the entire supporting and guiding assembly, simplifying the replacement and maintenance tasks as has been mentioned above.

Based on the previous C-shaped configuration, the possibility that the vertical elements, attaching each upper transverse element with each lower transverse element, comprise two parallel parts between which there is arranged a bracket in the upper area, and a lower flat bar in the lower area is contemplated.

The possibility is contemplated that at the ends of the frame, the vertical elements together with the upper and lower transverse elements, there is coupled at least one stringer with a geometric configuration according to the geometry of the segment of said conveyor belt.

The possibility that the lower sub-structure comprises a plurality of bearings, located such that they allow the sliding of said at least one conveyor belt is additionally contemplated. The bearings can be coupled to a plurality of arms respectively comprising a rotating shaft; and wherein said arms are collapsible with respect to an axis of rotation, allowing the handling of said at least one conveyor belt for its maintenance.

The frame optionally comprises at least one supporting and guiding mechanism linked thereto, wherein each supporting and guiding mechanism has coupled thereto at least one pair of bearings, such that in a service position of the supporting and guiding assembly, in the two bearings of a pair of bearings their axes of rotation are convergent towards the frame and perpendicular to a perimetric guiding profile.

Upon performing the inclusion of at least one supporting and guiding mechanism, which is linked to the actual frame, said at least one conveyor belt slides with the aid of said at least one pair of bearings since they come into contact with the perimetric guiding profile, which is coupled to said conveyor belt.

The spatial configuration of the position of the bearings is such that the axes of rotation of each bearing converge towards the frame and are perpendicular to the perimetric guiding profile, such that they adapt perfectly to the geometric configuration of said perimetric guiding profile.

The possibility that said at least one supporting and guiding mechanism is coupled to at least one of the surfaces of the projecting substantially flat structure is contemplated.

One of the options is that said bearings are coupled to each supporting and guiding mechanism on an inner side, close to the frame, such that said bearings allow their viewing and handling from an outer side, far from the frame. Since upon being coupled to an inner side of the actual supporting and guiding mechanism, this side being close to the frame, it allows the bearings to be viewed from an outer area and from which the operator is located for their visual inspection and possible maintenance.

The possibility is contemplated that the lower sub-structure comprises a plurality of holes intended for the coupling of supporting elements of the frame, such supporting elements being able to be, for example, supporting legs for support on the floor.

A supporting and guiding mechanism comprises a central fastening base comprising two inclined surfaces convergent towards said frame and perpendicular to a perimetric guiding profile, wherein central bearings are coupled to said inclined surfaces in the area opposite the frame, such that they allow their viewing and handling from the exterior, and two side extensions which are pivoting with respect to the central fastening base, wherein each side extension has coupled thereto an outer bearing, such that:
  a pair of upper bearings is formed by a central bearing and an upper bearing closer to a side extension, and
  a pair of lower bearings is formed by a central bearing and an upper bearing closer to the other side extension,
  each pair of bearings being located symmetrically with respect to said conveyor belt.

Thus, and unlike the state of the art, the supporting and guiding mechanism comprises two clearly differentiated parts:
  The central fastening base comprises two bearings which can be handled from the exterior without needing to completely disassemble the mechanism, being able to remove the defective bearings since they are coupled to said central fastening base part and allowing their removal in the outer direction, i.e., towards the position of the operator.
  The side extensions are coupled to the central fastening base, and wherein each side extension comprises a bearing which can also be removed from the exterior, facilitating the assembly, disassembly and viewing thereof.

With the bearings arranged in the mechanism, it is observed how they form two pairs of bearings, the upper pair normally being intended for the outgoing direction of the conveyor belt, and respectively the upper pair for the return of said conveyor belt.

Each pair of (upper and lower) bearings comprises a certain angle, such that the bearings forming a pair are symmetrical with respect to the conveyor belt sliding through them.

One of the embodiment options is that at least one central fastening base forms part of the frame; such that said central base is shaped in said frame, and the side extensions are directly coupled thereto.

Another embodiment option, which can be combined with the previous embodiment option, is that at least one central fastening base is coupled to a rear part of the frame; said central fastening base therefore being an element independent from the frame, being able to be configured from the same material as the side extensions.

According to the second option, the possibility that the supporting and guiding mechanism is fastened to the frame through at least two securing elements coupled to the central fastening base, such securing elements being screws, for example, and being able to be accessed and handled directly from the exterior of said supporting and guiding mechanism, is contemplated.

The possibility is contemplated that the frame to which said at least one supporting and guiding mechanism is coupled, or of which at least each central fastening base forms a part, is a frame comprising
  at least one substantially flat structure which is projecting with respect to said at least one base element and is open on one of its sides through which said at least one conveyor belt can be introduced/removed.

The possibility is contemplated that each side extension comprises two curved flat elements parallel to one another, attached by means of an attachment element located at ends of both curved elements farthest from the central fastening base, such that each outer bearing is coupled at an outer surface to each attachment element which allows its viewing and handling from the outer area opposite the frame.

Each side extension is thus defined by two curved elements attached by means of a bridge type attachment element, being able to contemplate a double C-shaped geometry, and wherein the most outstanding technical feature is the position of the bearings in the outer area of the respective attachment elements, since upon being located respectively in an outer surface, they may be easily handled or observed by the operator, without needing to disassemble the supporting and guiding mechanism.

The possibility is additionally contemplated that each side extension is articulated at articulation points located at ends of both curved elements closest to the central fastening base such that
  each side extension can pivot with respect to the central fastening base and can be removed when the operator wishes to do so, and
  the articulation points are located in the interior of each curved element such that the torque applied on each pair of bearings by the movement of said at least one conveyor belt causes a moment of forces assuring the guiding geometry of said conveyor belt without needing additional fastening elements for each side extension.

The possibility that both side extensions can pivot substantially facilitates the replacement of the bearings included therein, as well as the possible replacement of the side extension itself. Likewise, the position of the articulation points with respect to the position of each pair of (upper and lower) bearings gives rise to forcing the closing/service position of the supporting and guiding mechanism when the latter is operating, since the sliding of the conveyor belt generates a torque which, aided by the axis of rotation of the side extensions, gives rise to a moment of forces in the closing/service direction of each side extension without needing additional fastening elements for each side extension.

It is observed that the central space of the structure of each side extension comprising two curved flat elements parallel to one another is open, allowing the viewing and handling of the bearings from the exterior.

Said at least one supporting and guiding mechanism preferably comprises means for fixing the blocking in a determined position of the side extensions with respect to the central fastening base.

The operator can thus handle the means for the positioning and blocking to move each side extension according to the desired maintenance task, without needing to disassemble the entire supporting and guiding mechanism.

The possibility is contemplated that the means for the positioning and blocking comprise a slide device which positions and blocks the side extensions in three operating positions with respect to the central fastening base:

a) a first position in which both side extensions can freely pivot, b) a second position in which one of the side extensions is blocked in the service position and the other one can freely pivot, and c) a third position in which the two side extensions are blocked in the service position.

It is therefore possible to free a side extension, which can be, for example, the upper side extension, such that it is not necessary to unblock the other side extension and it can be removed without causing abnormal movements or forces to the blocked side extension.

The possibility is additionally contemplated that the slide device comprises a part having a U-shaped geometry located coplanar with respect to a larger surface of said at least one conveyor belt such that side branches of the slide device are coupled to the central fastening base through cavities shaped in said central fastening base, a base branch of the slide device is located such that it allows the operator to handle it from the exterior and define the three operating positions, and each side branch of the slide device comprises two holes for the coupling of the side extensions, wherein two first holes corresponding to a side extension comprise a greater length with respect to the other two second holes corresponding to the other side extension, such that it allows the sequential blocking of the side extensions defined in operating positions a) and b).

In other words, since there are two holes in which a side extension is coupled, and these holes have a greater length with respect to the holes of the other side extension, it is possible to block the first side extension and define the three operating positions:

a) the first position in which both side extensions can freely pivot, b) the second position in which one of the side extensions is blocked in the service position and the other one can freely pivot, and c) the third position in which the two side extensions are blocked in the service position, and all this by means of a configuration which is simple, robust and easy to maintain.

A perimetric guiding profile of those which are coupled to the side perimeter of a conveyor belt, and of those which are in contact with at least one pair of bearings, comprises a protrusion on which at least one pair of bearings contact; and wherein said protrusion comprises a symmetrical through hole with respect to a transverse axis of symmetry of said at least one perimetric guiding profile, an elastic area located after said protrusion, a U-shaped extension located after said elastic area and wherein the perimetric edge of a conveyor belt is coupled at said extension.

Said perimetric guiding profile is thus different from the state of the art because even though it comprises an elastic area absorbing the radial oscillations and the vibrations caused by the conveyor belt, it comprises a through hole, being able to have a circular configuration, which is capable of being deformed and of absorbing to a greater extent the mentioned oscillations/vibrations caused by said conveyor belt, in addition to allowing the reduction of the stresses caused by the bending during the passage of the perimetric guiding profile over the respective rollers (in the changes of direction of the movement), thus increasing its life under fatigue, reducing the possibility of breakage and reducing the radii of the movement transmission rollers.

Said perimetric guiding profile is preferably connected with a frame comprising at least one base element, and at least one substantially flat structure supported by said at least one base element; wherein said at least one substantially flat structure is projecting with respect to said at least one base element and is open on one of its sides through which said at least one conveyor belt can be introduced/removed.

The possibility that the area existing between said protrusion and the elastic area comprises respective grooves defining a contact-free space between the bearings and the elastic area, such that contact of the bearings with said elastic area is prevented, assuring the contact of the cylindrical surface of each bearing with the protrusion, is contemplated. Said technical feature grants a high degree of security since it provides a space which hinders the contact of the bearings with the elastic area, which is not very resistant to the contact of the sharp edges of the bearings themselves, improving both the service life of said perimetric guiding profile and the performance of the guiding, and therefore the power consumption of the entire supporting and guiding assembly is minimized with said grooves.

The possibility that the U-shaped extension comprises two branches inclined with respect to one another, which allows securing the perimetric edge of said conveyor belt, assuring that it will not become detached and service malfunctions will not occur is additionally contemplated.

The elastic area optionally comprises a segment having a length equal to or greater than the equivalent mean thickness of said segment, the length of the segment of elastic area in a preferred embodiment being comprised between 5 and 30 mm.

The elasticity ($K_{linear}$) of said elastic area will basically depend on three parameters: on the modulus of elasticity (E) of the material used for obtaining the profile, on the equivalent mean thickness ($G_{ME}$) and on the length (L) of the segment forming the elastic area.

The material used for manufacturing the profile, and the equivalent mean thickness ($G_{ME}$) of the elastic segment, will be determined by the stressing by forces in the system of the conveyor belt. The length (L) thereof will be equal to or greater than the equivalent mean thickness ($G_{ME}$) of said segment.

Due to the nature of the material from which the protrusion and the U-shaped extension of the perimetric guiding profile are made, said protrusion and U-shaped extension are provided with certain elasticity which can absorb a small part of the radial oscillations. The capacity for the absorption thereof is variable and difficult to quantify because it depends on many circumstances, such as the geometric deformation of the protrusion, as well as the exact joining point between the branches and the end of the conveyor belt. The incorporation of said elastic segment allows accurately determining and calculating the elastic capacity for the absorption of the radial oscillations since it is not affected by other circumstantial factors.

Therefore, according to the described invention, the frame for conveyor belts proposed by the invention is an advance in the frames used up until now, and fully and satisfactorily solves the problems set forth above in line with considerably simplifying the maintenance, repair and replacement of all the elements forming the assembly, minimizing the downtimes and saving in waiting costs and costs of parts to be replaced.

DESCRIPTION OF THE DRAWINGS

To complement the description being made and for the purpose of aiding to better understand the features of the invention according to a preferred practical embodiment thereof, a set of drawings is attached as an integral part of said description in which the following has been depicted with an illustrative and non-limiting character:

FIG. 19 shows a perspective view of the conveyor belt, with the perimetric profile duly assembled, in which its geometric configuration can be seen.

PREFERRED EMBODIMENT OF THE INVENTION

Figure 1:
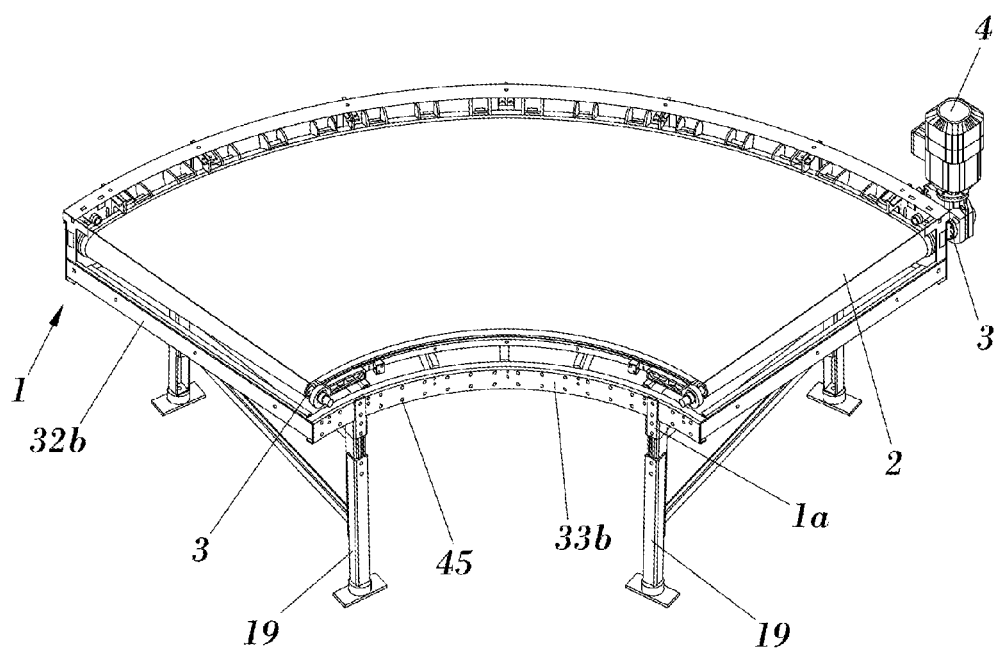
FIG. 1 shows a perspective view of a frame for a curved conveyor belt, in which part of the elements forming it can be seen, further including the guiding rollers of said conveyor belt.
Figure 2:
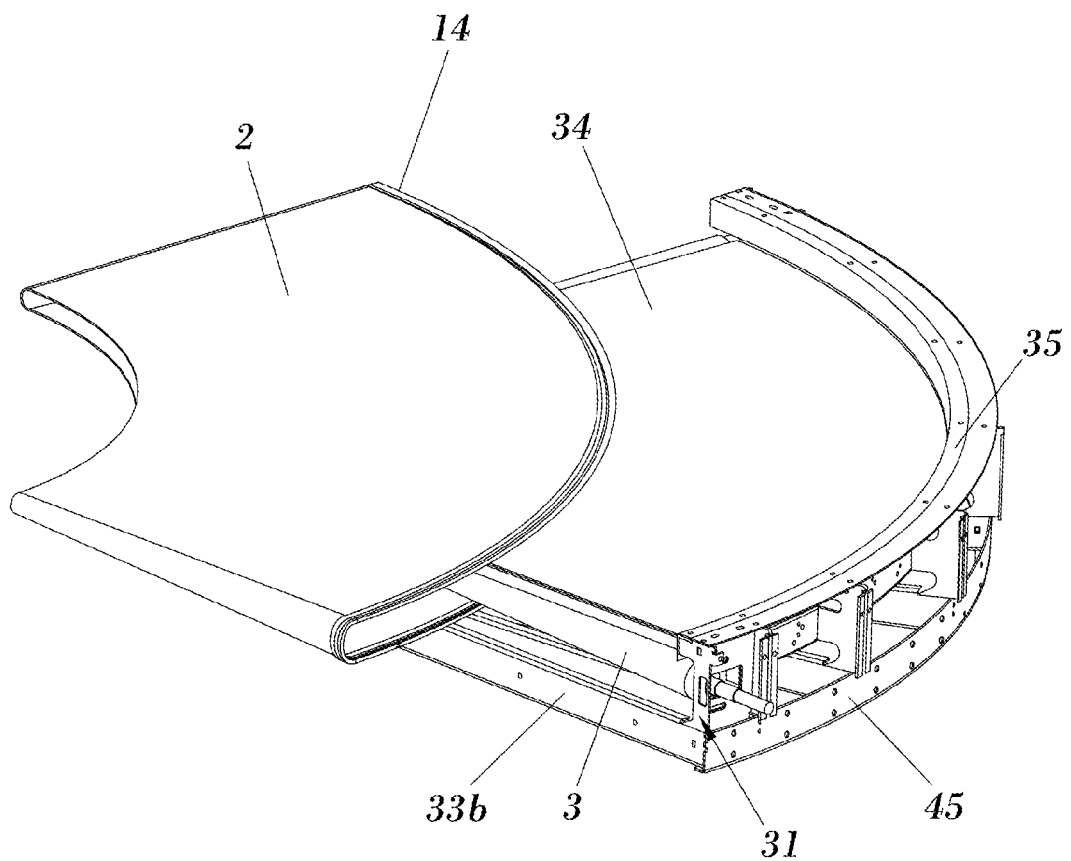
FIG. 2 shows a perspective view of the coupling/removal of a conveyor belt with respect to the projecting substantially flat structure.
Figure 3:
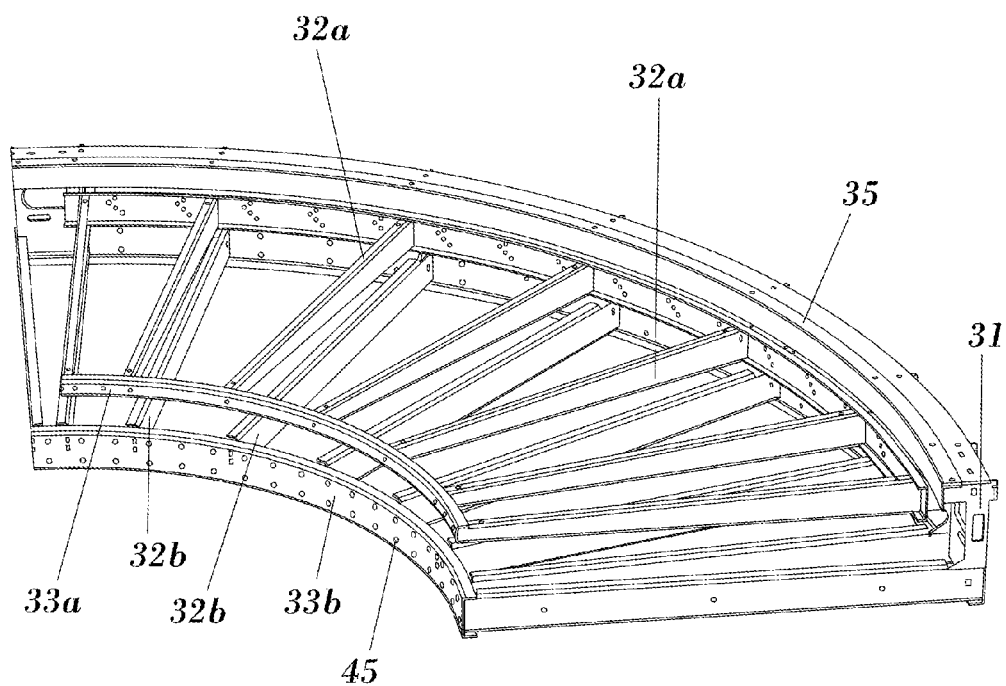
FIG. 3 shows a perspective view of a preferred embodiment with the C-shaped profile and in which the projecting substantially flat structure and the lower sub-structure are observed.
Figure 4:
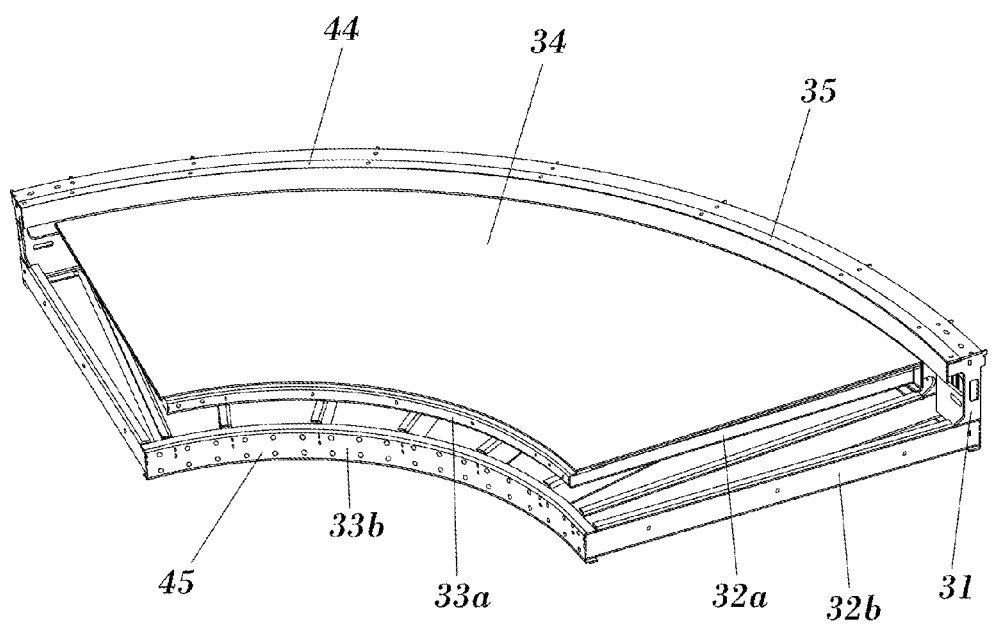
FIG. 4 shows a perspective view of the frame with the laminar cover fastened on the projecting substantially flat structure, on which the conveyor belt slides.
Figure 5:
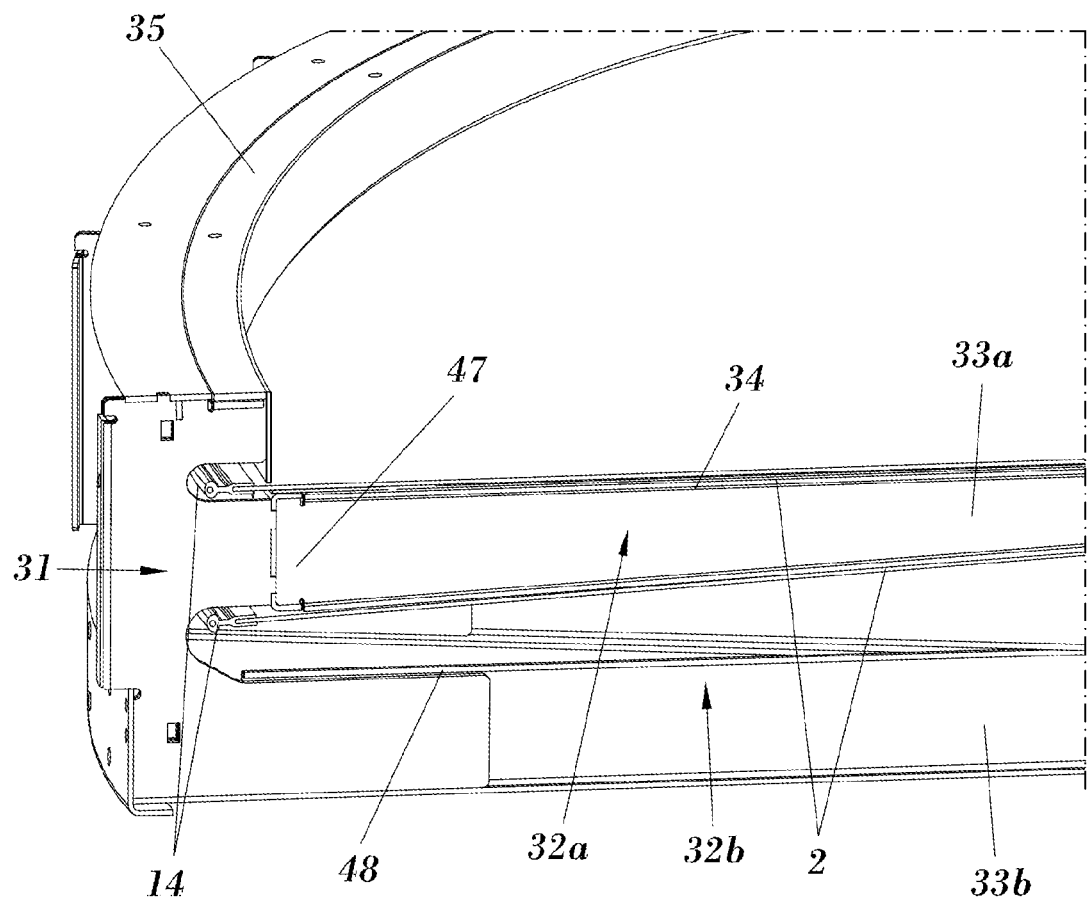
FIG. 5 shows a partial perspective view of the frame, with the conveyor belt placed in the service position, and the enveloping cover closed in the working position.
Figure 6:
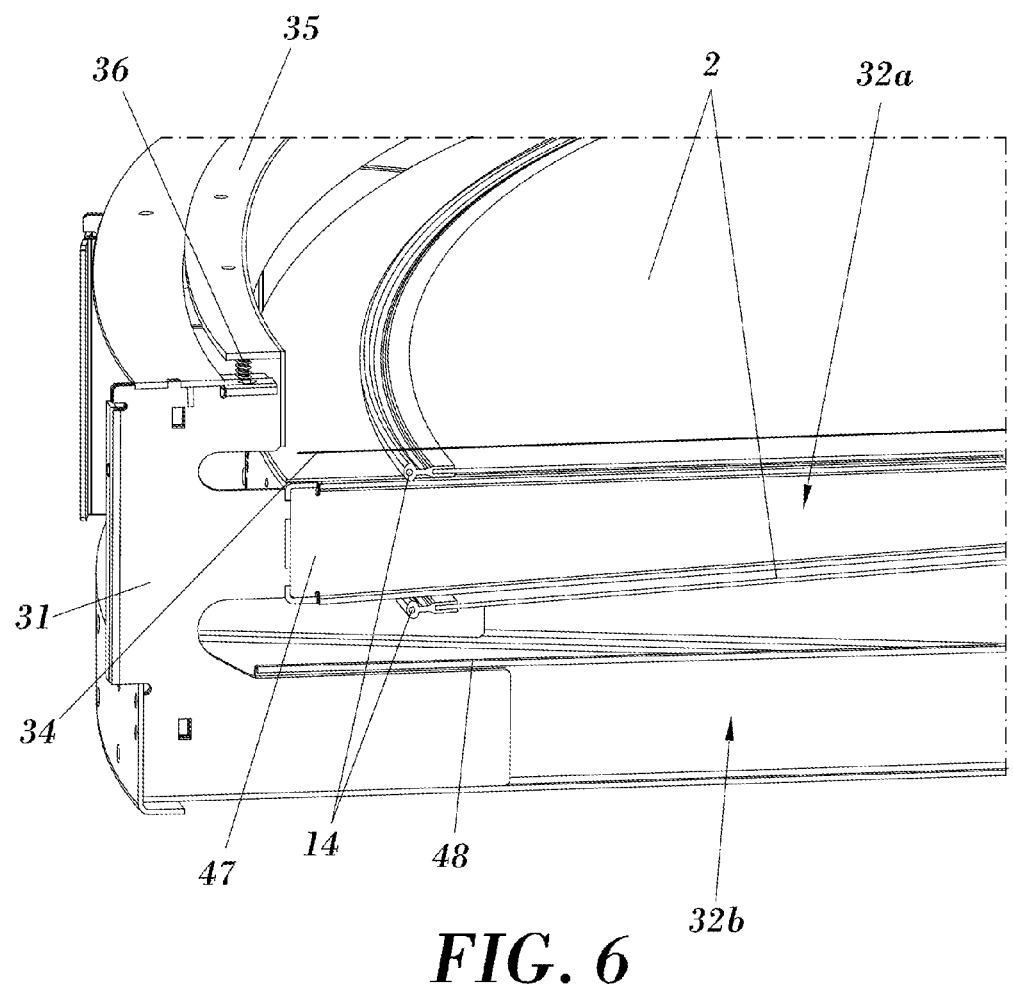
FIG. 6 shows a partial perspective view of the frame, with the conveyor belt partially removed, and the enveloping cover raised.
Figure 7:
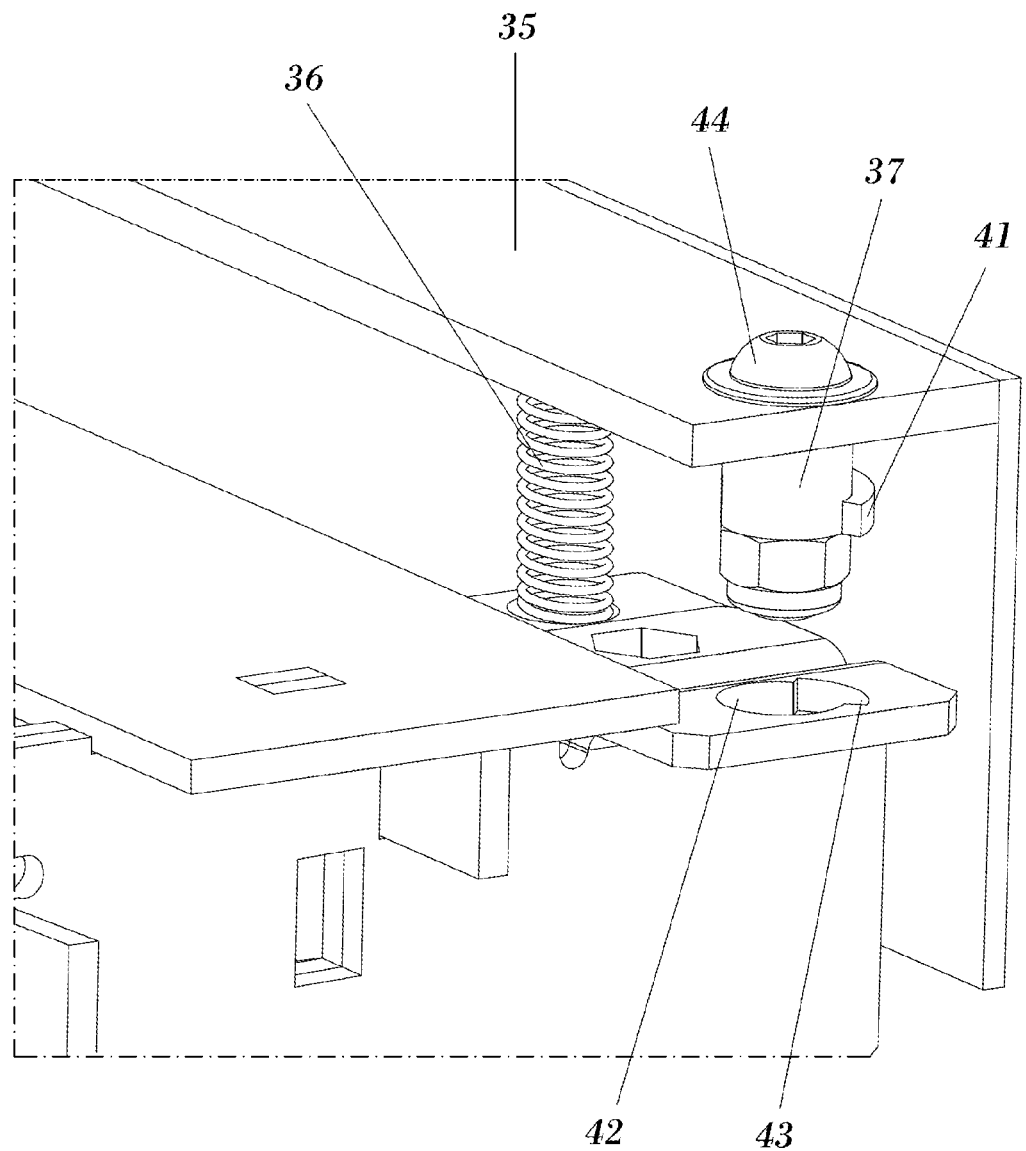
FIG. 7 shows a detailed perspective view of the retaining pin of the lifting device of the enveloping cover, in the raised position.
Figure 8:
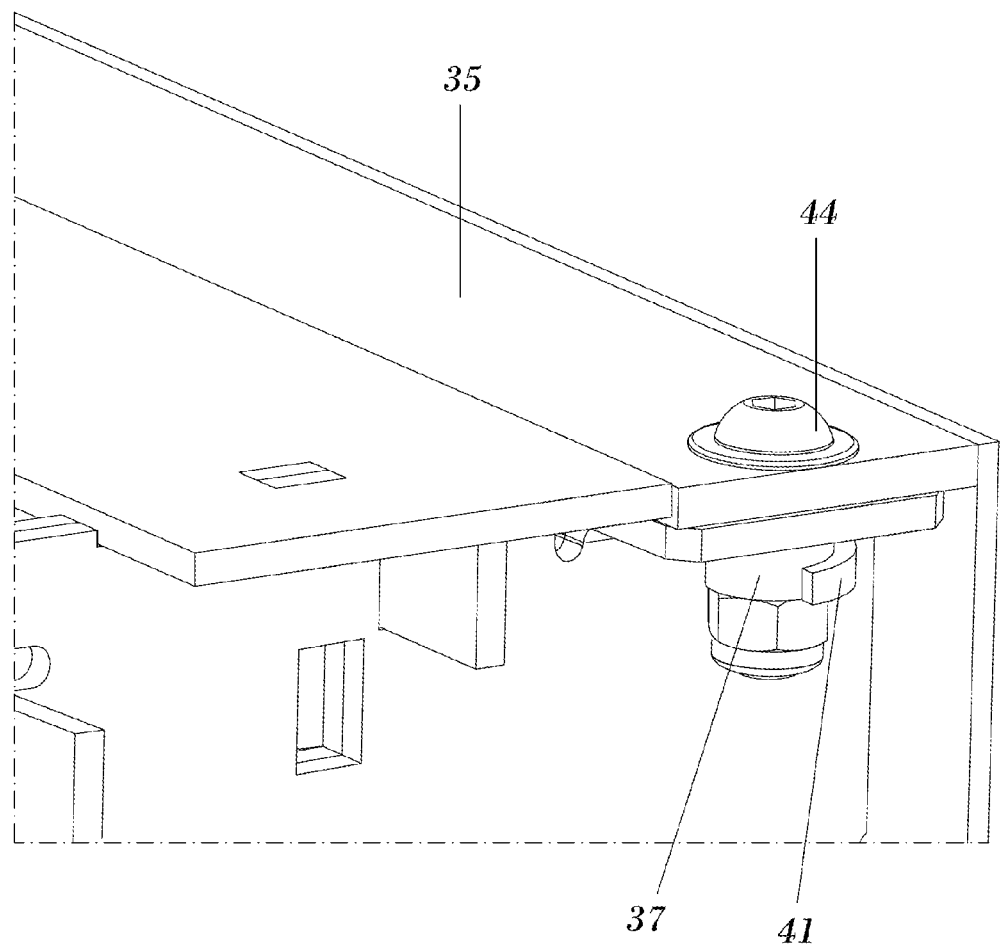
FIG. 8 shows a detailed perspective view of the retaining pin of the lifting device of the enveloping cover in the retaining position.
Figure 9:
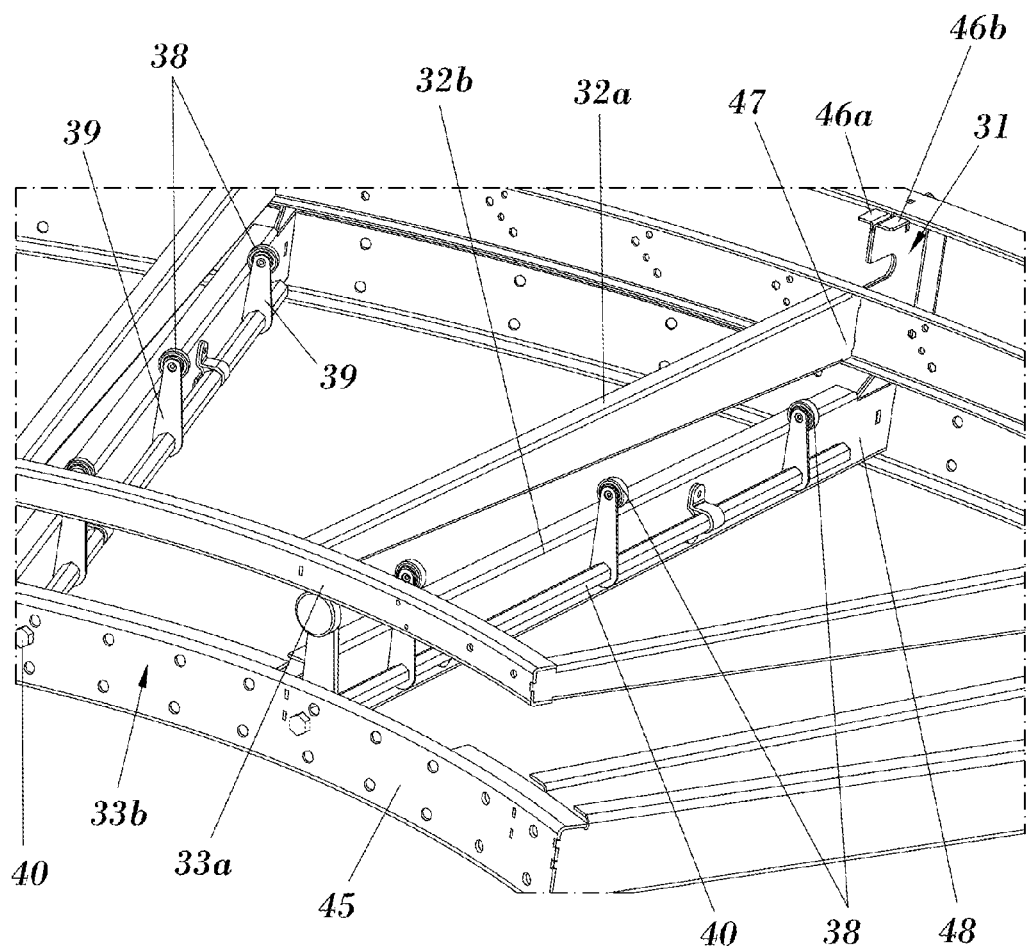
FIG. 9 shows a perspective view of the frame in which the arrangement of the collapsible bearings for supporting and guiding the conveyor belt can be seen.
Figure 10:
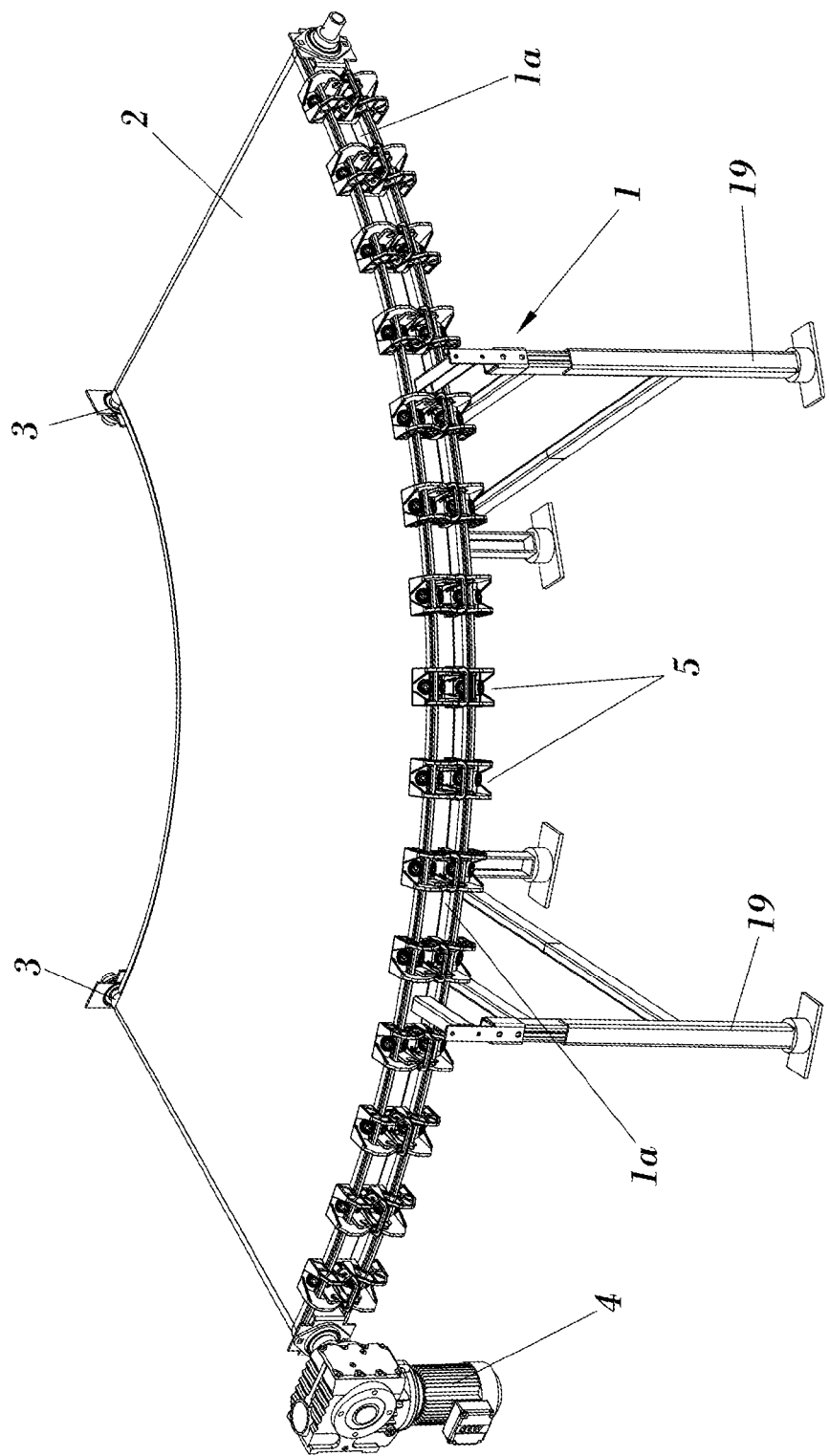
FIG. 10 shows a perspective view of a curved conveyor belt in which all the elements integrating it, including a plurality of supporting and guiding mechanisms object of the present invention, can be seen.
Figure 11:
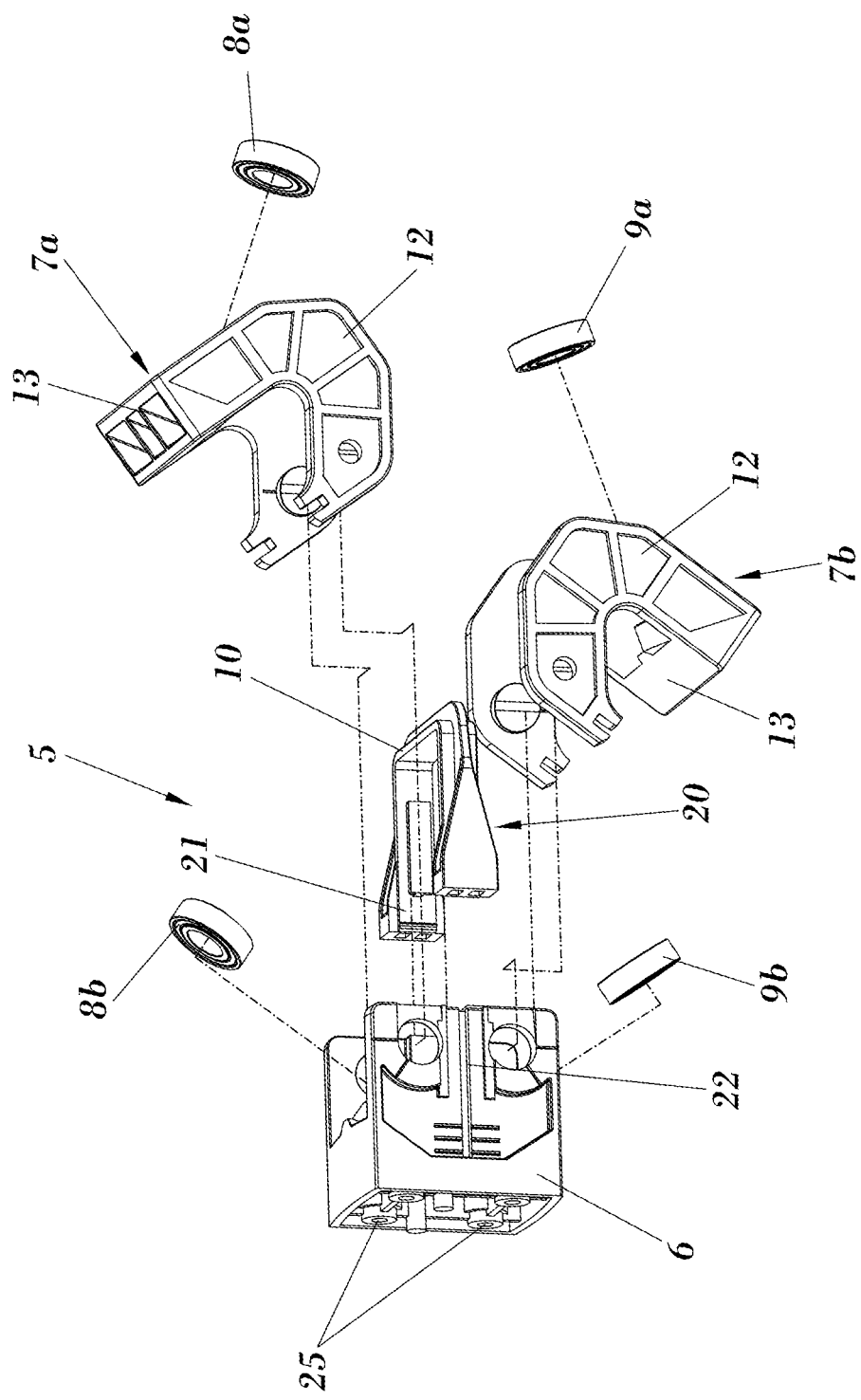
FIG. 11 shows an exploded perspective view of the different elements comprised in the supporting and of guiding mechanism.
Figure 12:
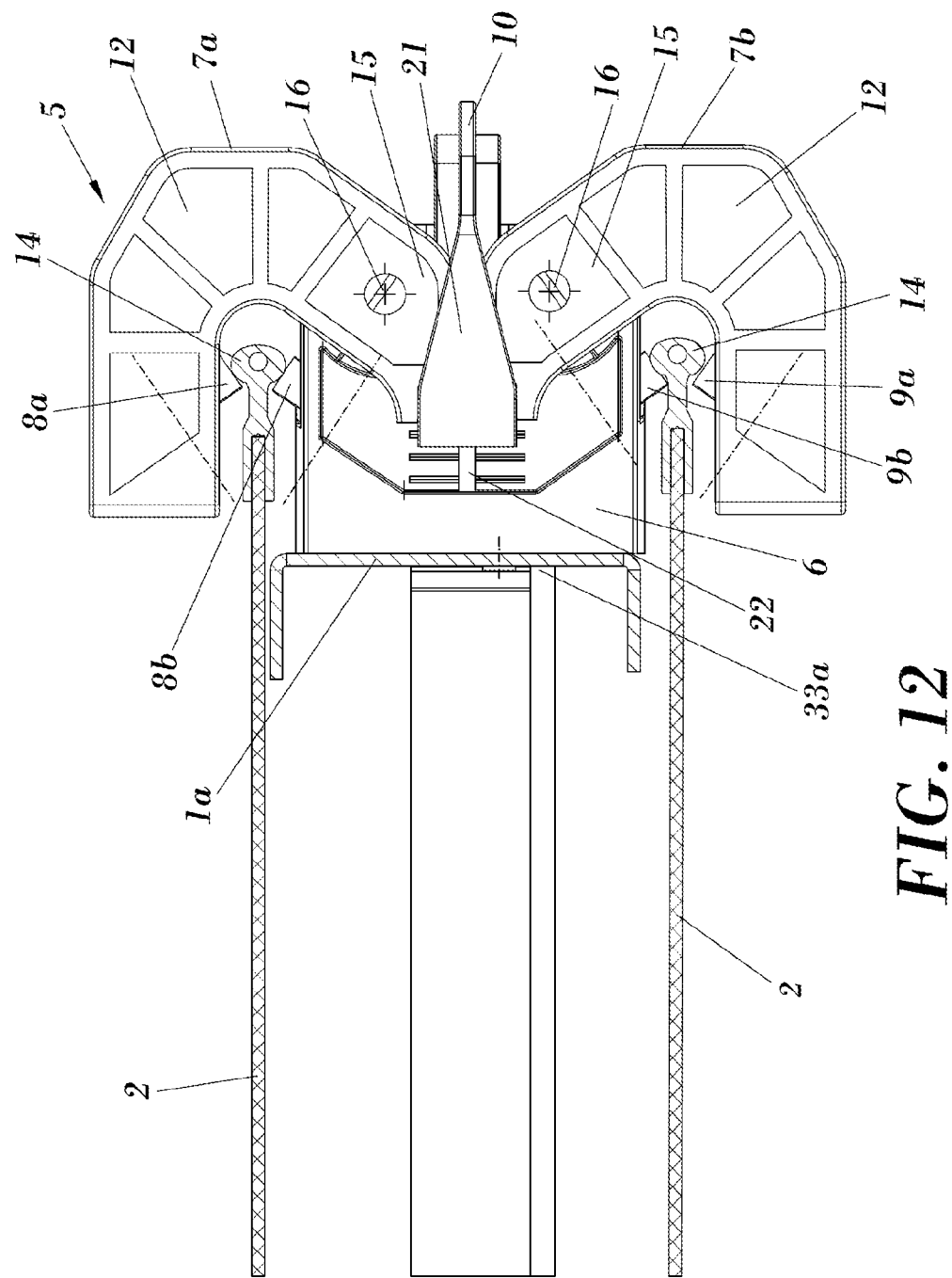
FIG. 12 shows a partial radial section of the curved conveyor belt in which the outer placement of the supporting and guiding assembly on the chassis can be seen, with the outgoing and return segments of the conveyor belt duly guided by the respective bearings.
Figure 13:
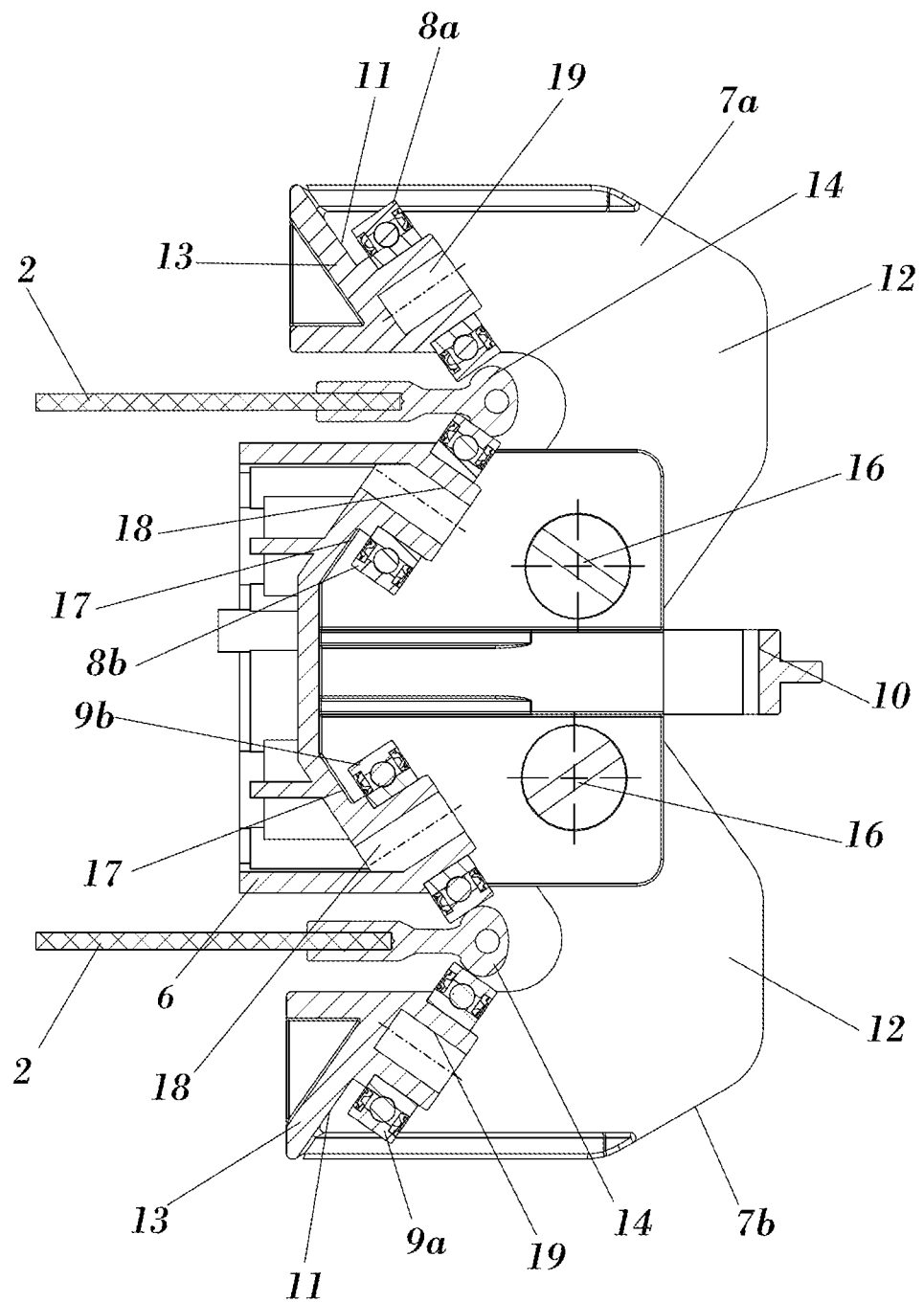
FIG. 13 shows a central longitudinal section of the supporting and guiding mechanism, in which the location of the bearings and their accessibility from the exterior can be seen.
Figure 14:
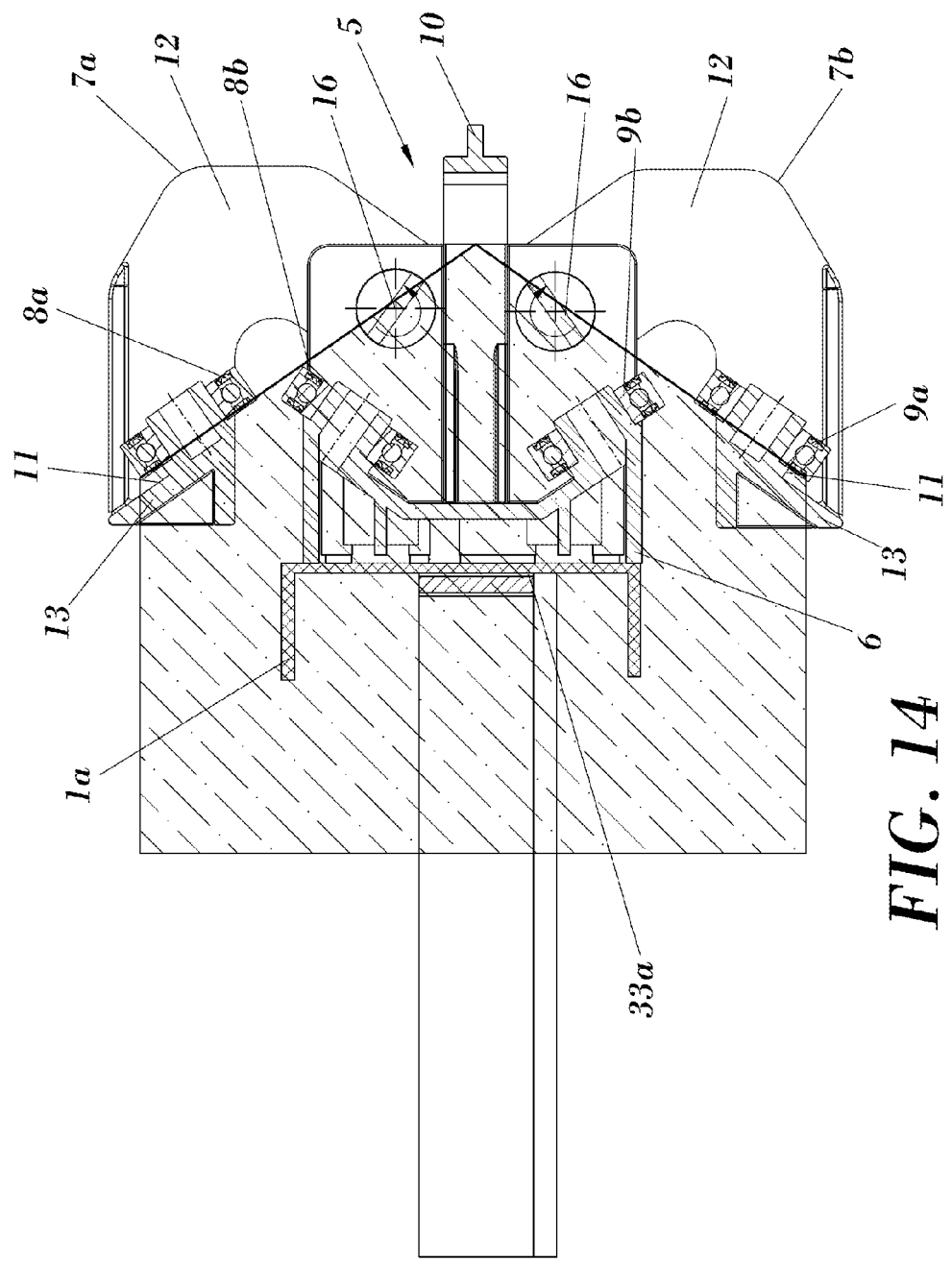
FIG. 14 shows a central longitudinal section similar to the previous one, in which the area of the location of the articulation point of the side extensions has been depicted.
Figure 15:
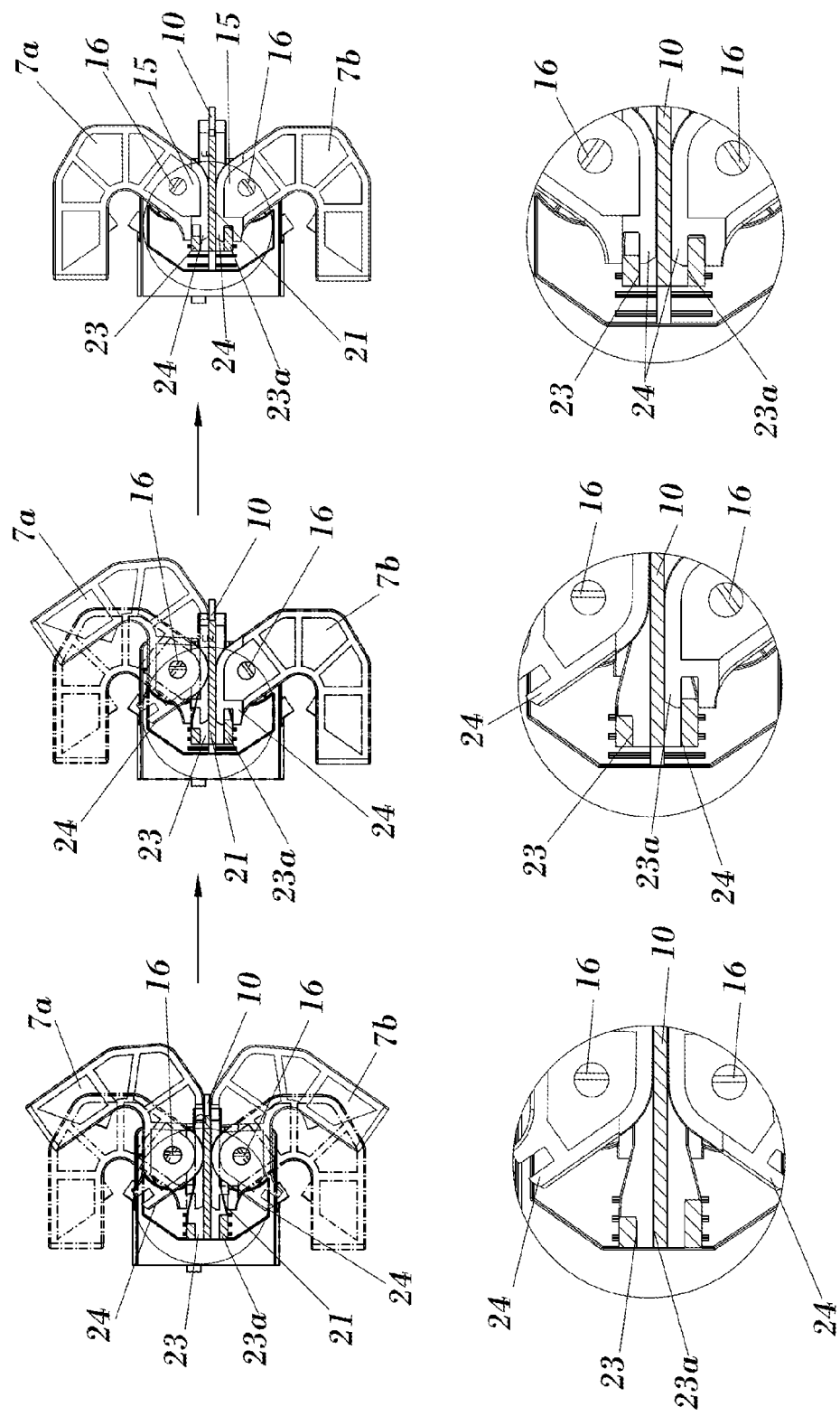
FIG. 15 shows a sequence of the supporting and guiding mechanism in its three operating positions, with its respective detailed views of the slide device for the sequential blocking thereof.
Figure 16:
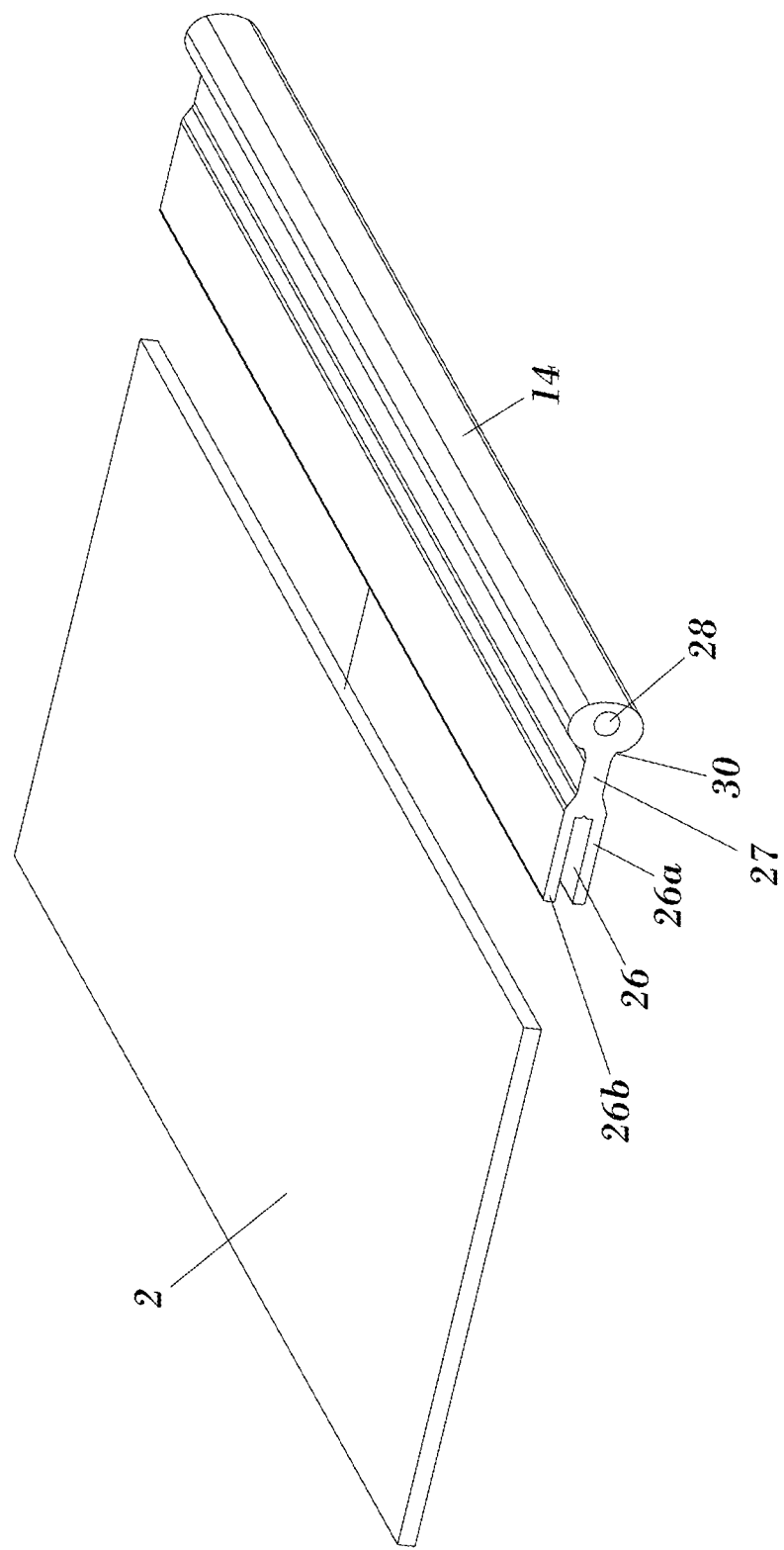
FIG. 16 shows a perspective view of a segment of the perimetric guiding profile of the conveyor belts in which the elastic area and the axial hole of the protrusion can be seen.
Figure 17:
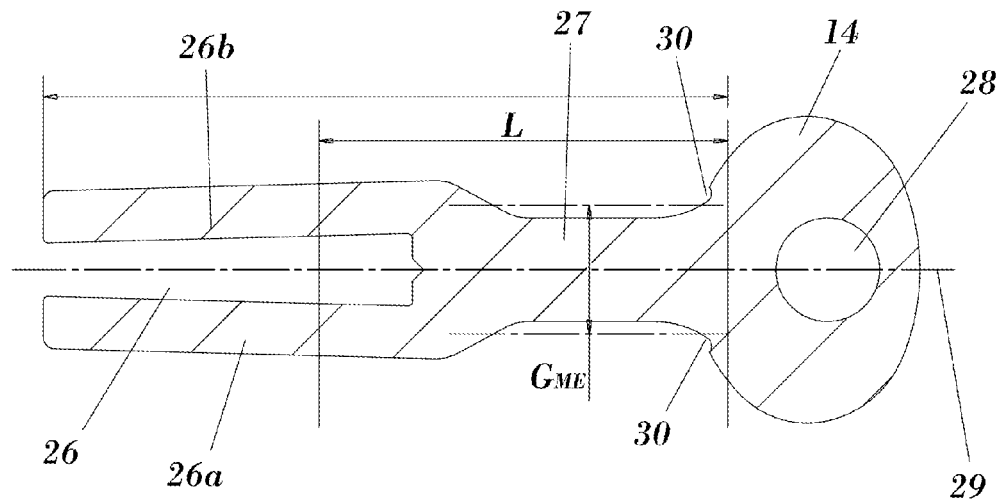
FIG. 17 shows a cross-section of an embodiment of the profile, with the elastic segment duly sized.
Figure 18:
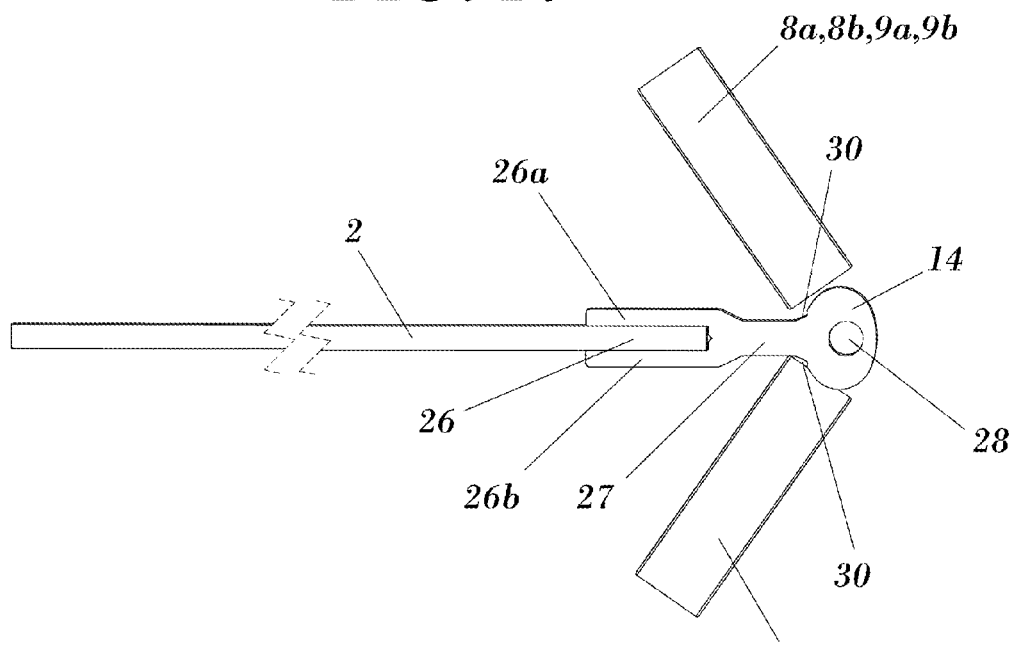
FIG. 18 shows a cross-section of the profile in which the guiding bearings have been depicted to show their operation.

In view of the discussed figures, it can be observed how a preferred embodiment of the frame (1) for conveyor belts (2) object of invention is described;

wherein said frame (1) comprises a base element (1*a*), a pair of rollers (3) wherein one of them is driven by means of an electric motor (4)

a plurality of upper transverse elements (32*a*) and a plurality of lower transverse elements (32*b*) located perpendicular to the direction of movement at each point of said conveyor belt (2) and at two height levels, a plurality of vertical elements (31) coupled respectively at the end of each pair of transverse elements (32*a*, 32*b*), each pair located in one and the same vertical plane such that it defines a C-shaped sub-structure open at one of its ends through which said at least one conveyor belt (2) can be introduced/removed, wherein the upper transverse elements (32*a*) coupled at the upper end of said vertical elements (31) allow the sliding of said conveyor belt (2) over them and define a substantially flat structure (33*a*), and wherein the lower transverse elements (32*b*) coupled at the lower end of said vertical elements (31) allow supporting the sliding of said conveyor belt (2) over them and define a lower sub-structure (33*b*).

Wherein said substantially flat structure (33*a*) comprises a laminar cover (34) on which said conveyor belt (2) slides.

And wherein an enveloping cover (35) is located on an upper side of the substantially flat structure (33*a*), such that the enveloping cover (35) comprises a lifting device for said enveloping cover (35), allowing the placement/removal of said conveyor belt (2).

The lifting device comprises a plurality of springs (36) coupled on one hand to the upper part of the substantially flat structure (33*a*) and on the other hand to the enveloping cover (35), and a plurality of retaining pins (37) of the plurality of springs (36) which allow blocking/unblocking said springs.

The retaining pins (37) comprise an inclined side flange (41), which pin penetrates the frame through a corresponding hole (42) provided with a notch (43), such that it allows the passage of the pin (37) and can pass through said notch (43) for the subsequent retention. Thus, by pressing on the enveloping cover (35), each pin (37) is introduced in its respective hole (42), and by rotating them through their outer head (44), the enveloping cover (35) is fastened against said frame (1).

Additionally the lower sub-structure (33*b*) comprises a plurality of bearings (38) which are coupled to a plurality of arms (39) respectively comprising a rotating shaft (40); and wherein said arms (39) are collapsible with respect to an axis of rotation allowing the handling of said conveyor belt (2).

The lower sub-structure (33*b*) comprises a plurality of holes (25) intended for the coupling of supporting elements for the frame, such supporting elements being able to be, for example, supporting legs (19) for support on the floor.

Additionally, at the ends of the frame (1), the vertical elements (31) together with the upper and lower transverse elements (32*a*, 32*b*), there is coupled at least one stringer (45) with a geometric configuration according to the geometry of the segment of said conveyor belt (2).

Based on the C-shaped configuration, the vertical elements (31), attaching each upper transverse element (32a) with each lower transverse element (32b), comprise two parallel parts (46a, 46b) between which there is arranged a bracket (47) in the upper area, and a lower flat bar (48) in the lower area.

Complementarily, a supporting and guiding mechanism (5) comprises a central fastening base (6) coupled to the rear part of the frame (1), wherein said central fastening base (6) comprises two inclined surfaces (17) convergent towards said frame (1) and perpendicular to a perimetric guiding profile, wherein two central bearings (8b, 9b) are coupled to said inclined surfaces (17) in the area opposite the frame (1), such that they allow their viewing and handling from the exterior, and two side extensions (7a, 7b) which are pivoting with respect to the central fastening base (6), wherein each side extension (7a, 7b) has coupled thereto an outer bearing (8a, 9a) such that:

a pair of upper bearings (8a, 8b) is formed by a central bearing (8b) and an upper bearing (8a) closer to a side extension (7a), and a pair of lower bearings (9a, 9b) is formed by a central bearing (9b) and an upper bearing (9a) closer to the other side extension (7b), each pair of bearings (8a, 8b) (9a, 9b) being located symmetrically with respect to said conveyor belt (2).

Each side extension (7a, 7b) comprises two curved flat elements (12) parallel to one another, attached by means of an attachment element (13) located at ends of both curved elements (12) farthest from the central fastening base (6), such that each outer bearing (8a, 9a) is coupled at an outer surface (11) to each attachment element (13) which allows its viewing and handling from the outer area opposite the frame (1).

Additionally, each side extension (7a, 7b) is articulated at articulation points (16) located at ends (15) of both curved elements (12) closest to the central fastening base (6) such that each side extension (7a, 7b) can pivot with respect to the central fastening base (6) and can be removed when the operator wishes to do so.

Each supporting and guiding mechanism (5) comprises means for fixing the blocking in a determined position of the side extensions (7a, 7b) with respect to the central fastening base (6); wherein the means for the positioning and blocking comprise a slide device (20) which positions and blocks the side extensions (7a, 7b) in three operating positions with respect to the central fastening base (6):

a) a first position in which both side extensions (7a, 7b) can freely pivot, b) a second position in which one of the side extensions (7a, 7b) is blocked in the service position and the other one can freely pivot, and c) a third position in which the two side extensions (7a, 7b) are blocked in the service position.

And the slide device (20) comprises a part having a U-shaped geometry located coplanar with respect to a larger surface of said at least one conveyor belt (2) such that side branches (21) of the slide device (20) are coupled to the central fastening base (6) through cavities (22) shaped in said central fastening base (6), a base branch (10) of the slide device (20) is located such that it allows the operator to handle it from the exterior and define the three operating positions, and each side branch (21) of the slide device (20) comprises two holes (23) for the coupling of the side extensions (7a, 7b), wherein two first holes (23a) corresponding to a side extension (7a, 7b) comprise a greater length with respect to the other two second holes (23b) corresponding to the other side extension (7a, 7b), such that it allows the sequential blocking of the side extensions (7a, 7b) defined in operating positions a) and b).

A perimetric guiding profile comprises a protrusion (14) on which the respective pairs of bearings (8a, 8b) (9a, 9b) contact; and wherein said protrusion (14) comprises a symmetrical through hole (28) with respect to a transverse axis of symmetry (29) of said at least one perimetric guiding profile, an elastic area (27) located after said protrusion (14), a U-shaped extension (26) located after said elastic area (27) and wherein the perimetric edge of a conveyor belt (2) is coupled at said extension (26); wherein the U-shaped extension (26) comprises two branches (26a, 26b) inclined with respect to one another, which allows securing the perimetric edge of said conveyor belt (2).

The elastic area (27) comprises a segment having a length equal to or greater than the equivalent mean thickness of said segment, the length of the segment of elastic area (27) being comprised between 5 and 30 mm.

Finally, the area existing between said protrusion (14) and the elastic area (27) comprises respective grooves (30) defining a contact-free space between the bearings (8a, 8b, 9a, 9b) and the elastic area (27), such that the bearings (8a, 8b, 9a, 9b) do not come into contact with said elastic area (27).

In view of this description and set of drawings, the person skilled in the art could understand that the embodiments of the invention which have been described can be combined in many ways within the object of the invention. The invention has been described according to several preferred embodiments thereof, but it will be evident for the person skilled in the art that many variations can be introduced in said preferred embodiments without exceeding the object of the claimed invention.

The invention claimed is:

1. Supporting and guiding mechanism (5), characterized in that it comprises a central fastening base (6) comprising two inclined surfaces (17) convergent towards a frame (1) and perpendicular to a perimetric guiding profile, wherein central bearings (8b, 9b) are coupled to said inclined surfaces (17) in the area opposite the frame (1), such that they allow their viewing and handling from the exterior, and two side extensions (7a, 7b) which are pivoting with respect to the central fastening base (6), wherein each side extension (7a, 7b) has coupled thereto an outer bearing (8a, 9a) such that:

a pair of upper bearings (8a, 8b) is formed by a central bearing (8b) and an upper bearing (8a) closer to a side extension (7a), and a pair of lower bearings (9a, 9b) is formed by a central bearing (9b) and an upper bearing (9a) closer to the other side extension (7b), each pair of bearings (8a, 8b) (9a, 9b) being located symmetrically with respect to said conveyor belt (2), further characterized in that each side extension (7a, 7b) comprises two curved flat elements (12) parallel to one another, attached by means of an attachment element (13) located at ends of both curved elements (12) farthest from the central fastening base (6), such that each outer bearing (8a, 9a) is coupled at an outer surface (11) to each attachment element (13) which allows its viewing and handling from the outer area opposite the frame (1).

2. Supporting and guiding mechanism according to claim 1, characterized in that at least one central fastening base (6) forms part of the frame (1).

3. Supporting and guiding mechanism according to claim 1, characterized in that at least one central fastening base (6) is coupled to a rear part of the frame (1).

4. Supporting and guiding mechanism according to claim 1, characterized in that each side extension (7a, 7b) is articulated at articulation points (16) located at ends (15) of both curved elements (12) closest to the central fastening base (6) such that
    each side extension (7a, 7b) can pivot with respect to the central fastening base (6) and can be removed when the operator wishes to do so, and
    the articulation points (16) are located in the interior of each curved element (12) such that the torque applied on each pair of bearings (8a, 8b) (9a, 9b) by the movement of said at least one conveyor belt (2) causes a moment of forces assuring the guiding geometry of said conveyor belt (2) without needing additional fastening elements for each side extension (7a, 7b).

5. Supporting and guiding mechanism according to any of claim 1, characterized in that said at least one supporting and guiding mechanism (5) comprises means for fixing the blocking in a determined position of the side extensions (7a, 7b) with respect to the central fastening base (6).

6. Supporting and guiding mechanism according to claim 5, characterized in that the means for the positioning and blocking comprise a slide device (20) which positions and blocks the side extensions (7a, 7b) in three operating positions with respect to the central fastening base (6):
    a) a first position in which both side extensions (7a, 7b) can freely pivot,
    b) a second position in which one of the side extensions (7a, 7b) is blocked in the service position and the other one can freely pivot, and
    c) a third position in which the two side extensions (7a, 7b) are blocked in the service position.

7. Supporting and guiding mechanism according to claim 6, characterized in that the slide device (20) comprises a part having a U-shaped geometry located coplanar with respect to a larger surface of said at least one conveyor belt (2) such that
    side branches (21) of the slide device (20) are coupled to the central fastening base (6) through cavities (22) shaped in said central fastening base (6),
    a branch base (10) of the slide device (20) is located such that it allows the operator to handle it from the exterior and define the three operating positions, and each side branch (21) of the slide device (20) comprises two holes (23) for
the coupling of the side extensions (7a, 7b), wherein two first holes (23a) corresponding to a side extension (7a, 7b) comprise a greater length with respect to the other two second holes (23b) corresponding to the other side extension (7a, 7b), such that it allows the sequential blocking of the side extensions (7a, 7b) defined in operating positions a) and b).

8. Perimetric guiding profile, characterized in that it comprises
    a protrusion (14) on which at least one pair of bearings (8a, 8b) (9a, 9b) contact; and wherein said protrusion (14) comprises a symmetrical through hole (28) with respect to a transverse axis of symmetry (29) of said at least one perimetric guiding profile,
    an elastic area (27) located after said protrusion (14),
    a U-shaped extension (26) located after said elastic area (27) and wherein the perimetric edge of a conveyor belt (2) is coupled at said extension (26),
    further characterized in that the area existing between said protrusion (14) and the elastic area (27) comprises respective grooves (30) defining a contact-free space between the bearings (8a, 8b, 9a, 9b) and the elastic area (27) preventing the contact of said bearings (8a, 8b, 9a, 9b) with said elastic area (27).

9. Perimetric guiding profile, characterized in that it comprises
    a protrusion (14) on which at least one pair of bearings (8a, 8b) (9a, 9b) contact; and wherein said protrusion (14) comprises a symmetrical through hole (28) with respect to a transverse axis of symmetry (29) of said at least one perimetric guiding profile,
    an elastic area (27) located after said protrusion (14),
    a U-shaped extension (26) located after said elastic area (27) and wherein the perimetric edge of a conveyor belt (2) is coupled at said extension (26),
    further characterized in that the U-shaped extension (26) comprises two branches (26a, 26b) inclined with respect to one another, which allows securing the perimetric edge of said conveyor belt (2).

* * * * *